United States Patent [19]

Hicks

[11] 3,903,565
[45] Sept. 9, 1975

[54] LEAF AND GRASS CART BAGGER

[76] Inventor: Littleberry T. Hicks, 1524 Deerwood Dr., Lynchburg, Va. 24502

[22] Filed: Dec. 5, 1973

[21] Appl. No.: 422,042

[52] U.S. Cl. .................. 15/352; 15/339; 15/340; 15/347
[51] Int. Cl.² ........................................ A47L 9/10
[58] Field of Search ............ 15/339, 340, 347, 352, 15/353; 141/314

[56] References Cited
UNITED STATES PATENTS

| 1,234,095 | 7/1917 | Duffie | 15/349 X |
|---|---|---|---|
| 2,286,421 | 6/1942 | Kahn | 15/347 X |
| 2,847,084 | 8/1958 | Wolfskill et al. | 15/339 X |
| 2,849,080 | 8/1958 | Enright | 15/339 X |
| 3,063,082 | 11/1962 | Rosenberg | 15/353 X |
| 3,169,843 | 2/1965 | Campbell | 15/420 X |
| 3,203,022 | 8/1965 | Clarke | 15/340 |
| 3,343,199 | 9/1967 | Nolte | 15/352 X |
| 3,490,090 | 1/1970 | Harrison | 15/340 X |
| 3,624,989 | 12/1971 | Gatheridge | 15/347 X |
| 3,710,412 | 1/1973 | Hollowell | 15/340 |

FOREIGN PATENTS OR APPLICATIONS

| 830,876 | 12/1937 | France | 15/340 |
|---|---|---|---|
| 417,663 | 2/1967 | Switzerland | 15/340 |

Primary Examiner—Harvey C. Hornsby
Assistant Examiner—C. K. Moore
Attorney, Agent, or Firm—David H. Semmes

[57] ABSTRACT

A leaf and grass cart bagger adapted for operative connection with a mower, tractor, or other vehicle equipped with a pickup and blower motor, or with a power or manually propelled lawn vacuum and the like, and which includes a wheeled cart pivotally mounting a perforated container into which leaves or grass are deposited and packed through a conduit from the blower of the pickup. The container has a removable lid interconnected to the discharge end of the conduit and the container pivotally mounted on the cart can be readily tilted to discharge material therefrom, preferably into a collection bag operatively engaged over the open top of the container.

5 Claims, 5 Drawing Figures

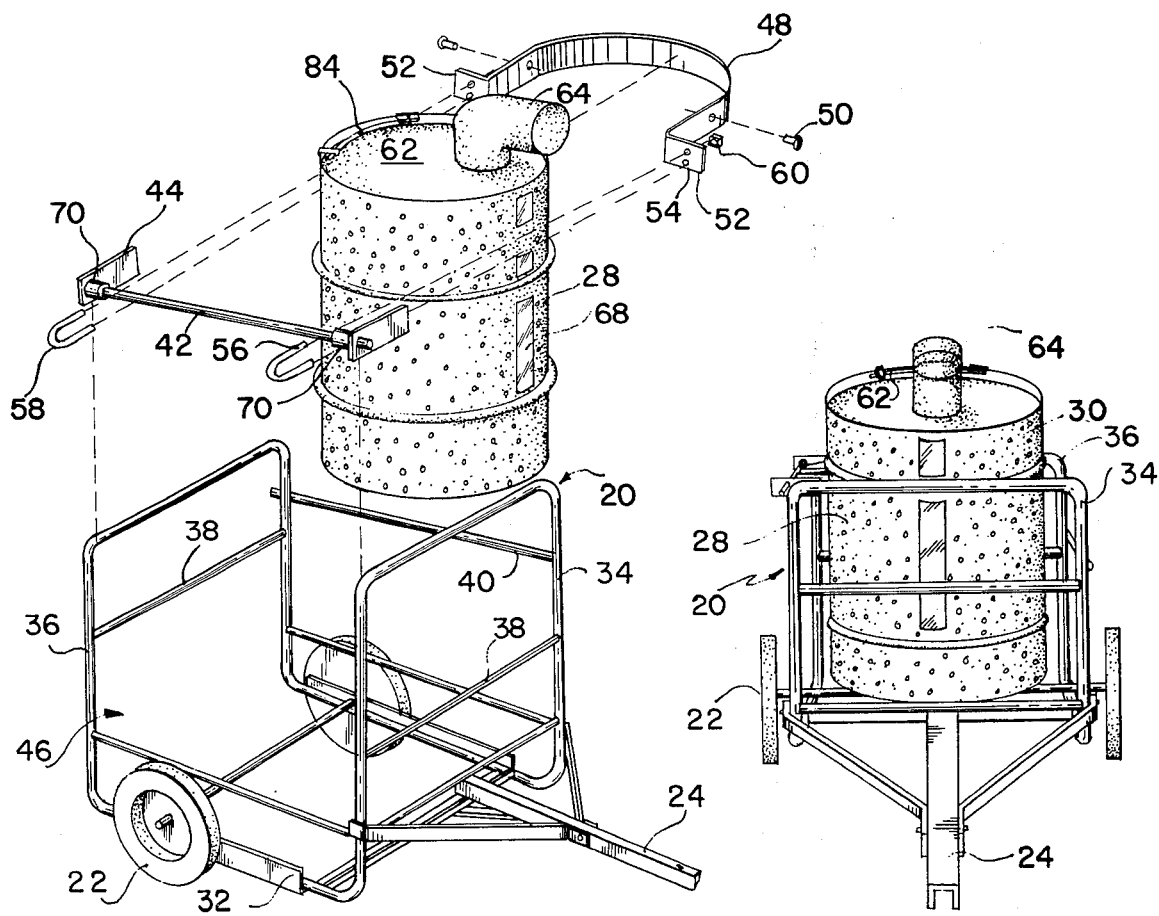
FIG. 3
FIG. 4
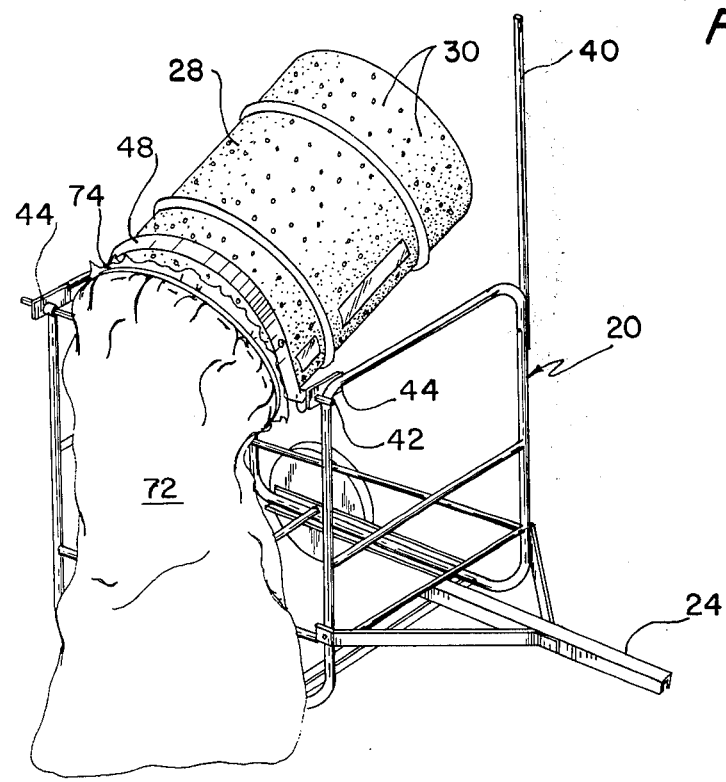
FIG. 5

LEAF AND GRASS CART BAGGER

BACKGROUND OF THE INVENTION

Heretofore bagging devices for leaves and grass have been utilized but in most designs have included a bag attached to a suction device which required subsequent emptying of the bag at a disposal area or other containers used which required substantial time and effort to empty after being filled.

The present invention is for a leaf and grass cart bagger which is extremely versatile and easy to operate and which additionally eliminates many of the problems encountered in emptying the previous known devices.

BRIEF DESCRIPTION OF THE INVENTION

The invention provides a leaf and grass cart bagger which is adapted for connection with a vehicle having a pickup and blower motor, such as a mower or tractor and the like. The device is also usable with a power or manually propelled lawn vacuum of known types. The structure includes a wheeled cart which mounts a perforated container into which leaves or grass are deposited and packed through a conduit from the blower of the pickup. The perforations in the container permit packing of the material therein by exhausting air from the container. A sight glass or opening is provided in the side of the container for viewing the contents and when full, a removable top is removed and a leaf bag or the like is operatively engaged over the open container top. The container is pivotally or hingedly mounted on the cart to facilitate tipping or lifting up of the container which permits discharging the collected material into a plastic bag which then can be removed and tied in the usual manner and the container thereafter tilted back to a collecting position on the cart. A conduit from the pickup and blower is connected to the removable lid. The construction makes it possible to suck up leaves, grass and the like, store the material in the container until full and bag the material so collected with the least amount of time and effort, with the so filled bag being ready for easy disposal.

Additional and further objects and advantages of the invention will be more readily apparent from the following detailed description of embodiments thereof when taken together with the accompanying drawings in which:

FIG. 3 is an exploded perspective view of the cart, container and mounting means for the container;

FIG. 4 is a front elevational view of the assembled cart and container; and

FIG. 5 is a perspective view of the cart and container showing the container in a material discharging or emptying position.

Figure 1:
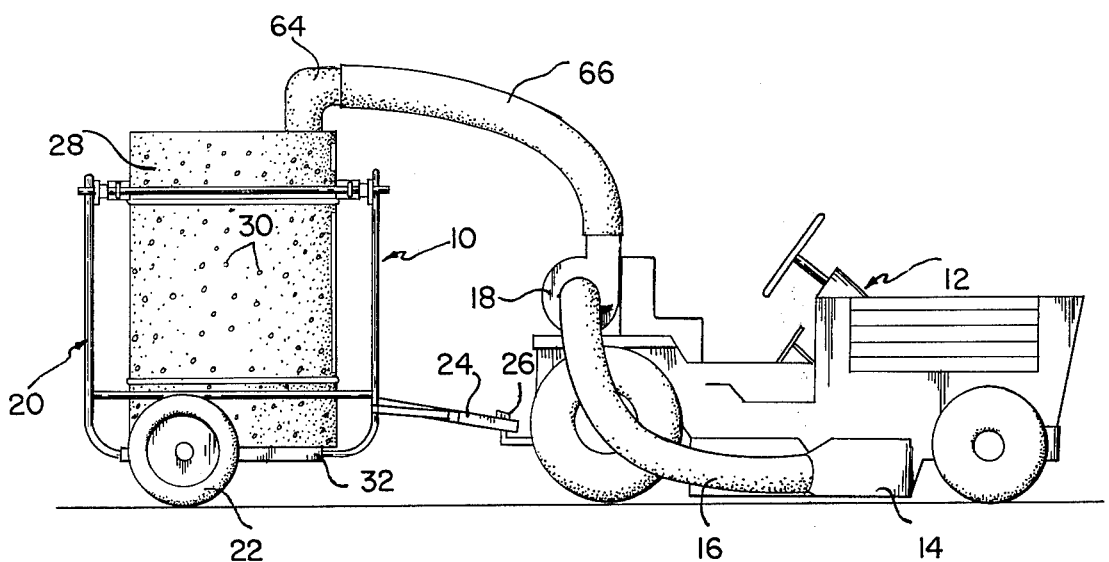
FIG. 1 is a side elevational view of the leaf and grass cart bagger of the invention operatively connected with a towing tractor having a pickup and blower device.

Referring now in more detail to the drawings, the leaf and grass cart bagger of the invention generally designated 10 is operatively connected to a towing vehicle 12 which in this combination is a tractor having incorporated thereon a leaf and grass pickup device 14 connected through conduit 16 to a blower 18. The leaf and grass cart bagger 10 generally includes a cart 20 having wheels 22. A tongue interconnects the cart as shown at 24 to a usual hitch 26 on the towing vehicle 12. A container 28 which is shown as a barrel having perforations 30 in the side thereof is mounted or supported on base portion 32 of the cart, the framework including a front panel 34 and a rear panel 36, with fixed side bars 38 which serve for additional placement and support of the container.

An important aspect of the present invention is the ability to tilt the container for emptying purposes. To this end, side bars 40 are removably connected to the end panels and a tilt bar or pipe 42 is attached to the frame through side plates 44 attached to the front and rear panels proximate the top thereof by welding or other known means and adjacent an open or unobstructed side generally indicated at 46 of the cart. A barrel strap 48 engages around the barrel in proximity to the upper end thereof and bolts or screws 50 can be used to interconnect and secure the barrel strap 48 and the body of the barrel or container 28. The ends 52 of the barrel strap are outwardly bent and drilled at 54 adapted for insertion therethrough of threaded ends 56 of U-bolts 58 which encircle bar or pipe 42 and are then secured by means of nuts 60. This construction permits, after removing side bars 40, pivoting of the container around bar or pipe 42 from a filling position as shown in FIG. 4 to a discharging tilted position as shown in FIG. 5. The construction and mounting are such that the barrel can be lifted up and tilted easily with one hand.

A removable lid or top 62 serves to selectively close or open the top open end of barrel 28 and can be secured in any desired manner. An elbow fitting 64 is operatively attached to lid 62 and the outer end of this elbow is interconnected by conduit 66 with the discharge from blower 18 for transmission of picked up material into the container.

Additional features include sight gage openings 68 in the side of the barrel which can be covered with plexiglass or the like and which serve for viewing the condition or state of filling of the barrel. Spacers 70 can be provided between the U-bolts 58 and plates 44 for proper positioning and ease of tilting.

When in use, the lid 62 is engaged on the barrel and as material is forced into the barrel with the air being exhausted through perforations 30 to facilitate material packing the amount within the barrel can be determined through the sight gage openings. When filled, the lid is removed and a plastic or the like leaf bag 72 engaged over the open top of the barrel as shown in FIG. 5 and preferably resiliently or otherwise engaged thereon by a resilient tiedown 74 in the nature of a rubber band or the like. The removable bar 40 is unhinged or removed and the barrel can be lifted up with one hand to the position shown in FIG. 5 and the contents thereof discharged into the bag 72. When this is accomplished, the tiedown is removed and the bag held at the top with one hand and the barrel then pushed or tilted back toward its upright position as shown in FIG. 4. The bag can then be tied and is ready for disposal in any desired manner.

Figure 2:
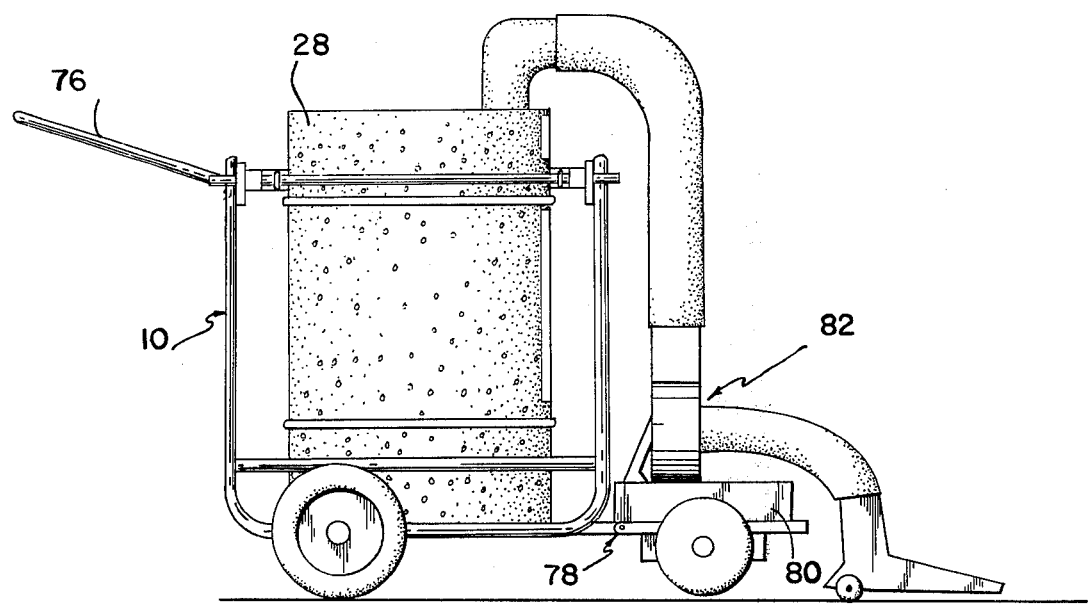
FIG. 2 is a side elevational view of the leaf and grass cart bagger operatively connected with a manually propelled lawn vacuum.

The leaf and grass cart bagger shown in FIG. 2 has substantially the same construction and the cart 10, which is provided with a handle 76, is operatively connected through ears, lugs and pins or the like generally indicated at 78 to the housing 80 of a power propelled or push type lawn vacuum generally designated 82, and the operation of loading and unloading the barrel is the same. The towing vehicle 12 as shown in FIG. 1 can consist of a riding mower of a usual known type.

As mentioned, any desired means can be used for securing the lid 62 on the open end of the barrel 28, and this can include a simple pivotal locking lever, such as generally indicated at 84 having an end pivotally mounted on lid 62 and the free end thereof engageable with a latch or hook mounted on the barrel.

Manifestly, minor changes in details of construction can be effected without departing from the spirit and scope of the invention as defined in and limited solely by the appended claims.

I claim:

1. A leaf and grass cart bagger comprising:
   A. a wheeled cart adapted for attachment to a vehicle having a material pick-up and blower;
   B. a barrel mounted on said cart, wherein said barrel further has a plurality of perforations through the side thereof adapted for exhausting air from the blower as material is discharged into said barrel from the blower, and;
   C. conduit means for interconnecting the discharge of said material pick-up and blower on a vehicle with the interior of said barrel for discharge of picked up material therein, wherein said barrel has an open upper end and, in an upright filling position, with a lid removably attached to and over said open upper end with said conduit means further having an end thereof attached to, and opening through, said lid, said lid when so attached serving both to close said open upper end of said container and to force said air from said blower to exhaust only through said barrel perforations whereby said discharged material is packed within said barrel, and;
   D. pivoted barrel emptying means interengaging said container and said cart to permit tilting of said barrel on said cart from said upright filling position to a tilted material emptying position, said pivoted emptying means comprising a barrel strap partially encircling and secured to said barrel, proximate the open upper end thereof, and pivotally secured around a bar connected to said cart for pivotally mounting said barrel about said bar, said pivoted emptying means further including, in said tilted material emptying position, said open upper end of said barrel with a material collection bag engaged thereover, and means resiliently attaching said bag to said barrel, whereby by removing said lid, attaching said bag and pivoting said barrel to said tilted position, material from said barrel is discharged into said bag for subsequent disposal thereof.

2. A leaf and grass cart bagger as claimed in claim 1, said cart comprising a frame including a bottom support for said container, front and rear panels, removable side bars on one side between said panels with the other side being open, whereby upon removal of said removable bars said container can be pivoted about said bar from said upright to said tilted positions.

3. A leaf and grass cart bagger as claimed in claim 1, wherein a sight gage opening is provided in the side of said barrel and closed by transparent material, the sight opening being adapted for visual discernment of the amount of material in said barrel.

4. A leaf and grass cart bagger as claimed in claim 1, wherein said vehicle comprises a riding mower and tongue and hitch interconnecting means between said cart and said riding mower.

5. A leaf and grass cart bagger as claimed in claim 1, wherein said vehicle comprises a lawn vacuum, said cart and said lawn vacuum being detachably interconnected and said cart having a guide handle thereon.

* * * * *